(12) United States Patent
Rangarajan et al.

(10) Patent No.: US 8,776,221 B2
(45) Date of Patent: Jul. 8, 2014

(54) DISTINGUISHING BETWEEN VOICE TRAFFIC AND DATA LINKS

(75) Inventors: Raghuram Rangarajan, Santa Clara, CA (US); David Kloper, San Jose, CA (US); Yohannes Tesfai, Silver Spring, MD (US)

(73) Assignee: Cisco Technology, Inc., San Jose, CA (US)

( * ) Notice: Subject to any disclaimer, the term of this patent is extended or adjusted under 35 U.S.C. 154(b) by 157 days.

(21) Appl. No.: 13/342,293

(22) Filed: Jan. 3, 2012

(65) Prior Publication Data

US 2012/0291127 A1 Nov. 15, 2012

Related U.S. Application Data

(60) Provisional application No. 61/484,817, filed on May 11, 2011.

(51) Int. Cl.
*G06F 11/10* (2006.01)
*H03M 13/09* (2006.01)

(52) U.S. Cl.
USPC .......................................... 726/22; 714/799

(58) Field of Classification Search
USPC .......................................... 726/22; 714/799
See application file for complete search history.

(56) References Cited

U.S. PATENT DOCUMENTS

| | | | |
|---|---|---|---|
| 6,920,562 B1 * | 7/2005 | Kerr et al. ..................... 713/189 |
| 6,941,110 B2 | 9/2005 | Kloper et al. | |
| 7,079,812 B2 | 7/2006 | Miller et al. | |
| 7,184,777 B2 | 2/2007 | Diener et al. | |
| 7,194,760 B2 * | 3/2007 | Nordman et al. ............... 726/5 |
| 7,292,656 B2 | 11/2007 | Kloper et al. | |
| 7,755,485 B2 * | 7/2010 | Howard et al. ............ 340/572.1 |
| 8,020,069 B1 * | 9/2011 | Feng et al. ..................... 714/758 |
| 2003/0161471 A1 * | 8/2003 | Jou et al. ....................... 380/268 |
| 2004/0128589 A1 * | 7/2004 | Lewis .......................... 714/700 |
| 2004/0170121 A1 * | 9/2004 | Kim et al. .................... 370/208 |
| 2009/0063936 A1 * | 3/2009 | Kanda et al. .................. 714/776 |
| 2009/0327333 A1 | 12/2009 | Diener et al. | |
| 2010/0153540 A1 * | 6/2010 | Li et al. ......................... 709/224 |
| 2012/0057703 A1 * | 3/2012 | Hsuan et al. .................. 380/268 |

OTHER PUBLICATIONS

International Search Report and Written Opinion in counterpart International Application No. PCT/US2012/036099, mailed Jun. 25, 2012.

\* cited by examiner

*Primary Examiner* — Kambiz Zand
*Assistant Examiner* — Aubrey Wyszynski
(74) *Attorney, Agent, or Firm* — Edell, Shapiro & Finnan, LLC

(57) ABSTRACT

Techniques are provided for receiving a transmitted first packet that was formatted using a known scrambling algorithm with an unknown scrambling seed. An encoded packet payload is extracted from the first packet header. The encoded packet payload header is decoded to obtain a first scrambled packet payload header. For each potential value of the unknown seed, the first scrambled packet payload header is descrambled to produce a first set of descrambled packet payload headers and for each potential value of initial register values associated with a cyclic redundancy check, the cyclic redundancy check is executed comprising polynomial division on each of the descrambled packet payload headers such that when the polynomial division results in a zero remainder, a potential unscrambled payload header for the first packet is obtained. Information about the first packet is obtained from the potential unscrambled payload header.

26 Claims, 11 Drawing Sheets

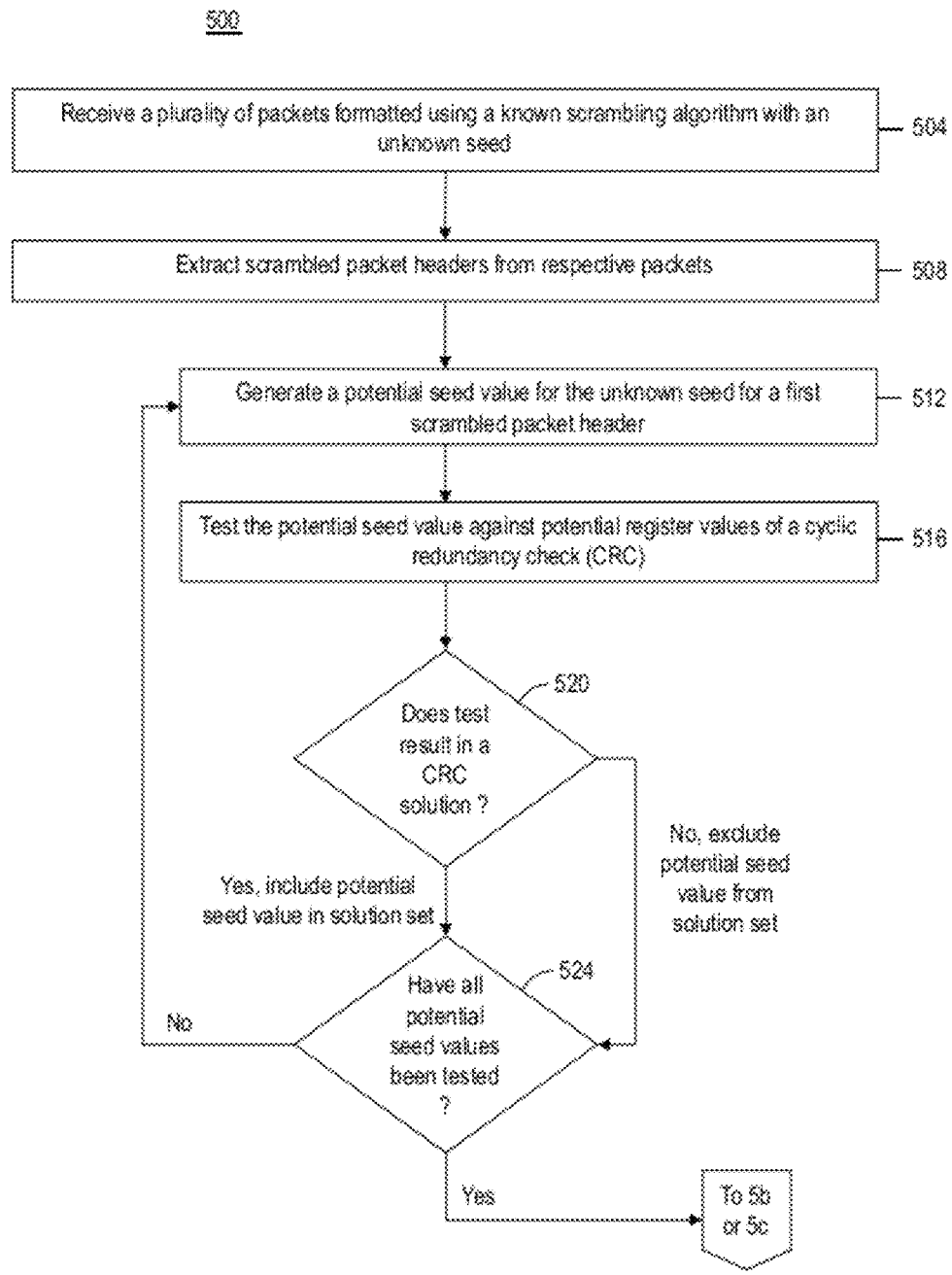

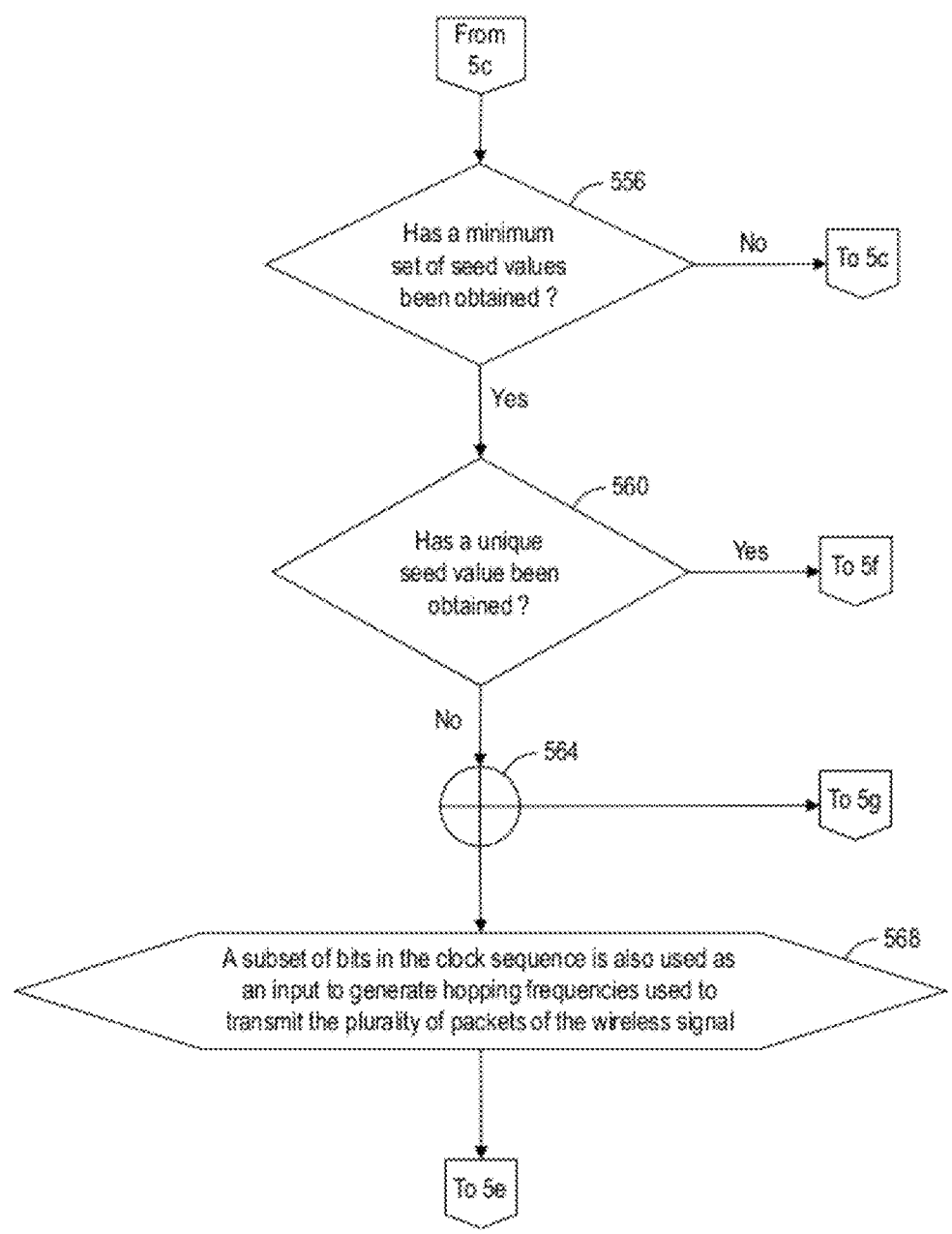

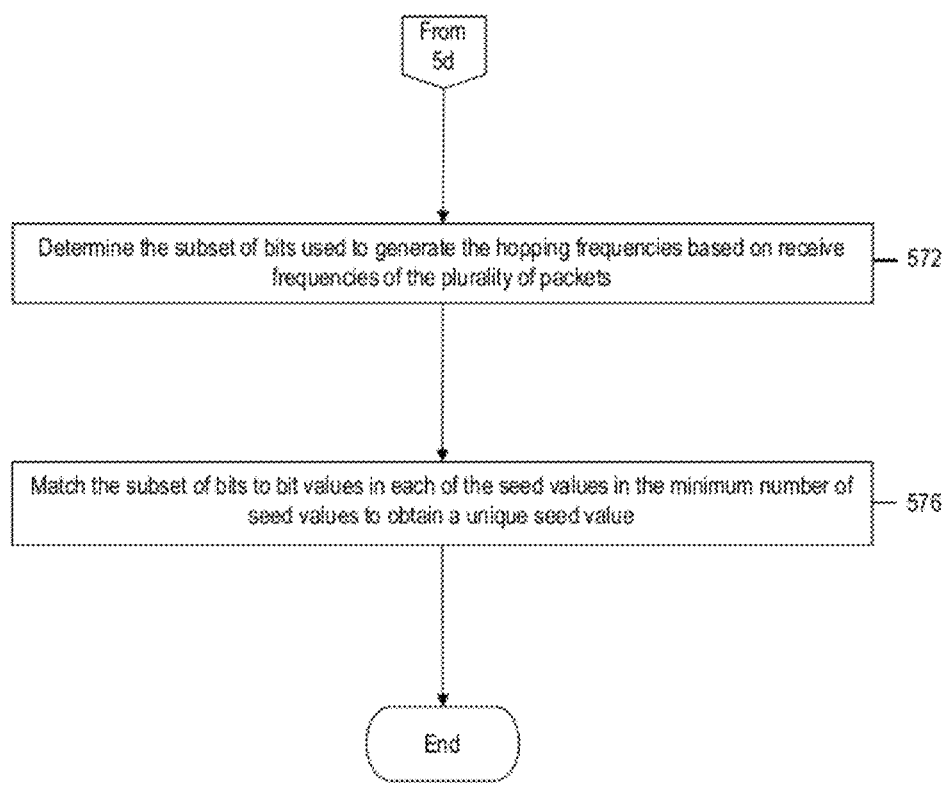

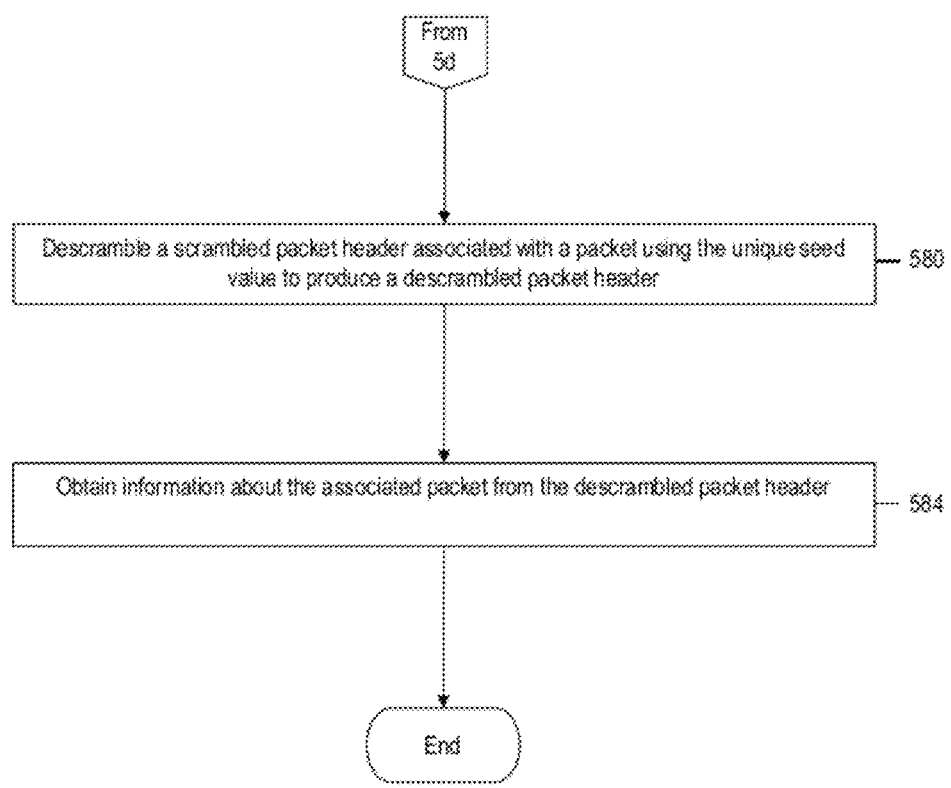

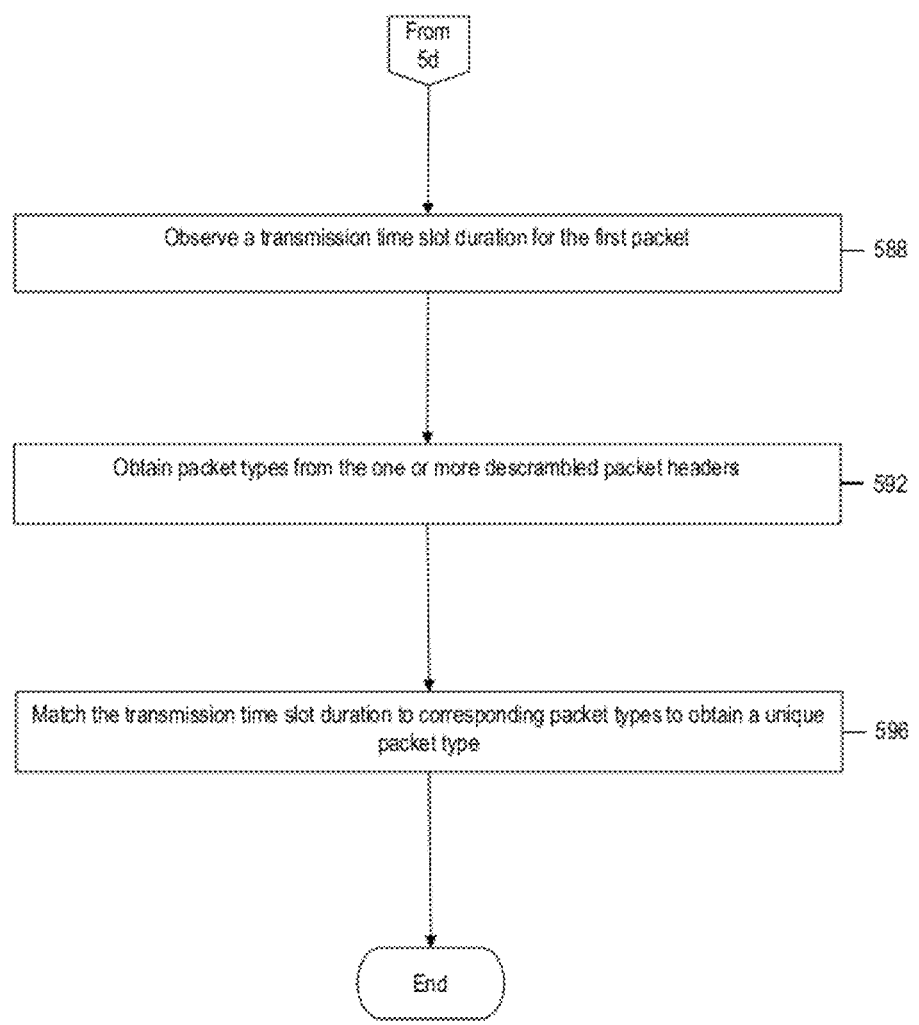

DISTINGUISHING BETWEEN VOICE TRAFFIC AND DATA LINKS

CROSS REFERENCE TO RELATED APPLICATION

This application claims priority to U.S. Provisional Application No. 61/484,817, filed May 11, 2011, the entirety of which is incorporated herein by reference.

TECHNICAL FIELD

The present disclosure relates to Bluetooth voice and data links.

BACKGROUND

Wireless personal area networks are computer networks that provide communication among devices in close proximity to each other or an individual's person. Wireless personal area networks can be formed using many wireless standards, e.g., Bluetooth®, Z-Wave, or ZigBee. For example, Bluetooth®, hereinafter "Bluetooth," is a proprietary open wireless technology standard that allows fixed or mobile devices to exchange data over short distances. Bluetooth uses "master" and "slave" devices in which one master is associated with up to seven slaves that can form wireless personal area networks with eight active devices that are commonly referred to as a piconet. Up to 255 additional devices may be in a standby or "parked" state. Bluetooth provides wireless connectivity for short range, e.g., one to 100 meters or greater, that operate in the unlicensed radio frequency spectrum in the 2.4-2.5 GHz band.

Bluetooth transmissions may use spectrum that overlaps and interferes with other types of communication, e.g., WiFi™ wireless transmissions. Bluetooth communication may include voice, data, or a combination of voice and data with various qualities of service and bit rates. The type of information communicated is indicated by a packet type code embedded in the packet header. Further, there are known security issues within the Bluetooth protocol. Network operators currently have no way to identify Bluetooth device packet types and the locations of the associated Bluetooth devices.

BRIEF DESCRIPTION OF THE DRAWINGS

FIGS. 5a-5g depict an example flowchart generally depicting a process for analyzing packet headers according to the techniques described herein.

DESCRIPTION OF EXAMPLE EMBODIMENTS

Overview

Techniques are provided herein for receiving a transmitted first packet that was formatted using a known scrambling algorithm with an unknown seed that is obtained from clock bit values at a time instance, e.g., a predetermined numbed of bits taken from a 32 bit clock. An encoded packet payload header of the first packet is extracted. The encoded packet payload header is decoded to obtain a first scrambled packet payload header. For each potential value of the unknown seed, the first scrambled packet payload header is descrambled to produce a first set of descrambled packet payload headers. For each potential value of initial register values associated with a cyclic redundancy check, the cyclic redundancy check is executed comprising polynomial division on each of the descrambled packet payload headers such that when the polynomial division results in a zero remainder, a potential unscrambled payload header for the first packet is obtained. Information about the first packet is obtained from the potential unscrambled payload header.

The information may be used to determine if the packet is associated with voice traffic, data traffic, or a combination of voice and data traffic. In addition, the information and a transmission time associated with the packet may be used to determine if the packet is associated with a master communication device or a slave communication device in a wireless network employing master and slave device relationships. It should be noted that devices operating by the Bluetooth specification can readily get this information by actively participating in the piconet and transmitting frames, but this information is not ordinarily available to passive devices, nor could a standard Bluetooth implementation track multiple piconets.

Example Embodiments

Figure 1:
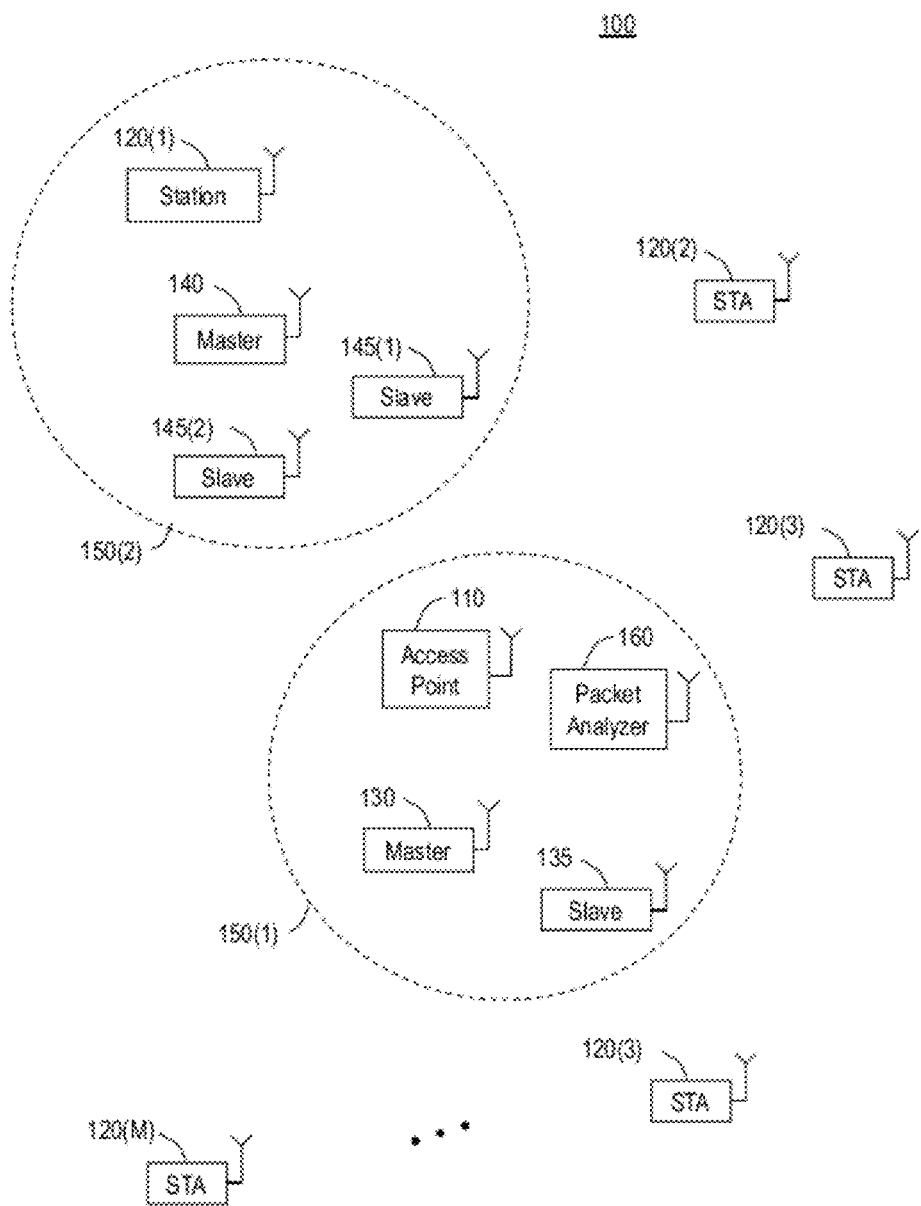
FIG. 1 is a block diagram showing an example of a wireless network comprising an access point, a plurality of wireless devices, and a packet analyzer that is configured to analyze packet headers in received signals according to the techniques described herein.

Referring first to FIG. 1, an example of a wireless network 100 is shown including a access point (AP) 110 and a plurality of wireless stations 120(1)-120(M) that communicate according to a first wireless standard, e.g., to form a Wireless Local Area Network (WLAN). Network 100 also has master wireless devices 130 and 140 that communicate with slave wireless devices 135, and 145(1)-145(2), respectively, using a second wireless standard. Further, master device 130 and slave device 135 may form a short range network, referred to as a piconet. Master device 140 and slaves devices 145(1)-145(2) also may form a piconet. Portions of the spectrum used by the first and second wireless standards may overlap. In this regard, the transmissions between master device 130 and slave device 135 form an interference region 150(1) that causes interference with AP 110's communication with stations (STAs) 120(1)-120(M). Likewise, the transmissions between master device 140 and slave devices 145(1) and 145(2) form an interference region 150(2) that interferes with communications between station (STA) 120(1) and AP 110.

Network 100 comprises a packet analyzer 160 that is configured to analyze packet headers for transmissions received from master devices 130 and 140, and slave devices 135, 145(1), and 145(2) according to the second wireless standard, e.g., the Bluetooth standard. According to the second wireless standard, these packet headers are scrambled using seed value. The seed value is unknown to the packet analyzer 160 and must be derived in order to obtain information about the packet from the packet headers, e.g., a packet type associated the packet or whether the packet was transmitted from a master device or a slave device. To derive the seed value and determine the packet type, packet analyzer 160 employs process 500 that is referred to herein as "packet type detection process logic." Briefly, packet type detection process logic 500 determines a seed value that was used to scramble the packet headers based on known operations of the second wireless standard and then descrambles the packet header using the seed value. The packet type detection process logic 500 is generally described in connection with FIGS. 2 and 4, and is described in greater detail in connection with FIGS. 3 and 5.

In addition to interference, there are known security issues with Bluetooth communications. For example, a Bluetooth spy device may be planted within network 100 to steal information, e.g., personal contact lists, from Bluetooth devices operating in their respective piconets. In this regard, packet analyzer 160 may relay Bluetooth packet type information to various access points, e.g., AP 110, or other processing facilities. The access point can then identify which devices are master devices and which devices are slave devices. The information may also be used to specifically locate an individual Bluetooth device. For example, once a Bluetooth device is identified, geolocation techniques may be employed to pinpoint the device location. Several APs may act together to determine the device's position, e.g., using received signal strength for triangulation, time distance of arrival for hyperbolic positioning, smart antennas, etc. Once the device is identified and/or located, the network operator can take appropriate action to mitigate interference or protect the network from rogue devices.

System 100 may employ other network elements, e.g., routers, public switched telephone network connections, service provider gateways, Internet connections, or additional wireless APs and packet analyzers. The packet analyzers may be stand alone devices or they may be coupled to or communicate with AP 110 or any of the various STAs 120(1)-120 (M).

Figure 2:
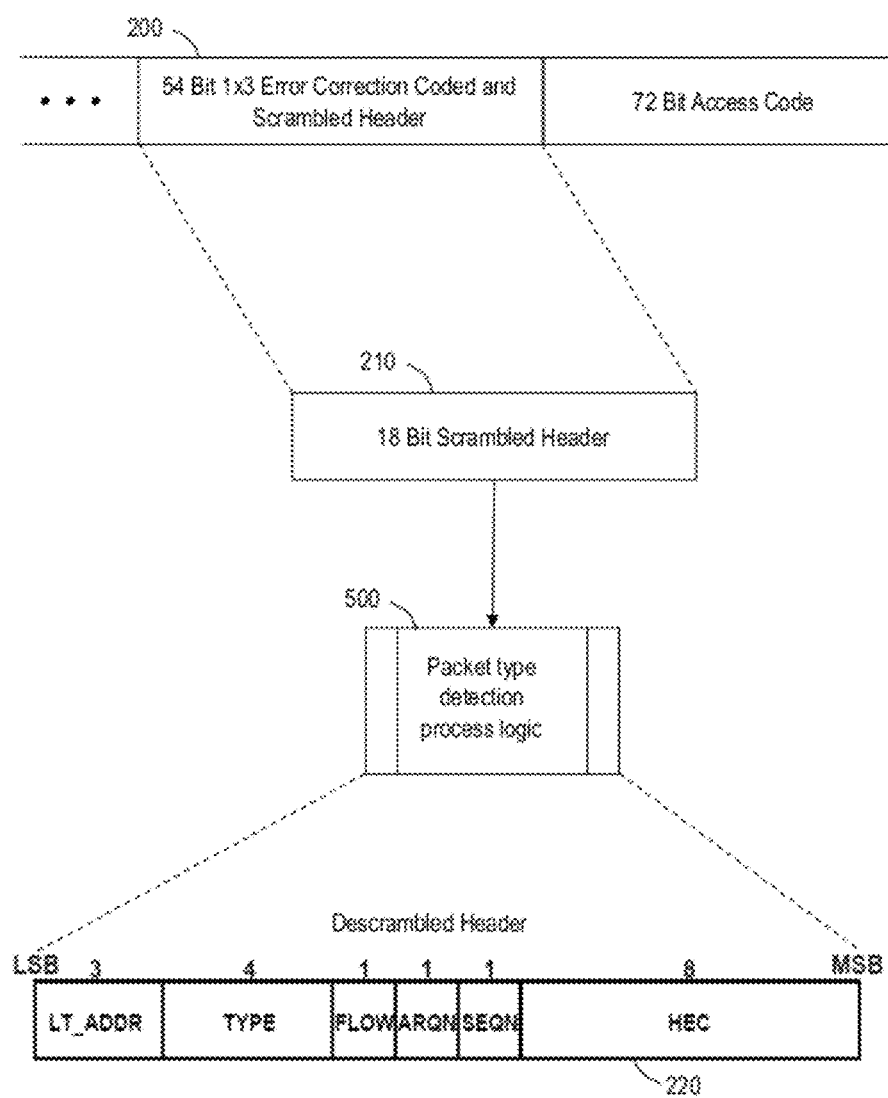
FIG. 2 is a diagram of an example of a Bluetooth packet header that has been analyzed and descrambled according to the techniques described herein.

Referring to FIG. 2, an example Bluetooth packet header is shown that has been analyzed and descrambled. At 200, a portion of a transmitted Bluetooth is shown with the 54 bit 1×3 error correction encoded scrambled header. The mechanics of the 1×3 error correction code are known and, at 210, the 18 bit scrambled header is determined from the 54 bit header. Packet type detection process logic 500 descrambles the 18 bit header to produce an 18 bit descrambled header 220 with a 4 bit packet type following the Logical Transport Address (LT_ADDR) field. The 4 bit packet type provides some of the desired information about the Bluetooth packet.

Example packet type codes are shown in Table 1 below:

The example shown in Table 1 is taken from a version of the Bluetooth protocol and indicates that four segments are used. The packets used within a piconet are related to the logical transports for which they are used, e.g., piconets served by master devices 130 and 140, respectively. Three logical transports with distinct packet types are defined: the Synchronous Connection-Oriented (SCO) logical transport, the Extended SCO (eSCO) logical transport, and the Asynchronous Control Link (ACL) logical transport. For each of these logical transports, 15 different packet types can be defined by the four bit in the "Type CODE" field. To indicate the different packets on a logical transport, the 4-bit TYPE code is used. The packet types are divided into four segments. The first segment is reserved for control packets. All control packets occupy a single time slot. The second segment is reserved for packets occupying a single time slot, the third segment is reserved for packets occupying three time slots, and the fourth segment is reserved for packets occupying five time slots. The slot occupancy is reflected in the segmentation and can directly be derived from the type code.

In Table 1, "D" represents data while "V" represents voice, and "H" represents high quality and "M" represents medium quality. Other abbreviations are not germane to the techniques described herein. Voice is transmitted synchronously, e.g., using SCO, while data are transmitted asynchronously, e.g., using ACL. Note that the number of time slots is a further identifying feature that may be used to classify packet types, e.g., when 5 time slots are occupied, DH5 or DM5 is used to transmit data.

Information obtained from the packet transmission characteristics, e.g., transmission timing, time slot occupancy, and packet type can provide useful information to a network operator. For example, distinguishing voice from data usage allows the operator to implement general policies or specific policies for a geographic area. There are known security issues with ACL and type detection can trigger network policy enforcement. Transmission timing allows the network operator to distinguish master devices from slave devices. In this regard, it is useful to detect and report on each individual device. Separation of devices improves convergence of location, as location accuracy is reduced when mixing measurements from several devices. Separation of devices can also be used to flag devices that operate with multiple clients, and could be providing network access versus simple file sharing.

TABLE 1

Bluetooth packet types.

| Segment | Type CODE | Time slot occupancy | SCO (1 Mbps) | eSCO (1 Mbps) | eSCO (2-3 Mbps) | ACL (1 Mbps) | ACL (2-3 Mbps) |
|---|---|---|---|---|---|---|---|
| 1 | 0000 | 1 | NULL | NULL | NULL | NULL | NULL |
|   | 0001 | 1 | POLL | POLL | POLL | POLL | POLL |
|   | 0010 | 1 | FHS | Reserved | Reserved | FHS | FHS |
|   | 0011 | 1 | DM1 | Reserved | Reserved | DM1 | DM1 |
| 2 | 0100 | 1 | Undefined | Undefined | Undefined | DH1 | 2-DH1 |
|   | 0101 | 1 | HV1 | Undefined | Undefined | Undefined | Undefined |
|   | 0110 | 1 | HV2 | Undefined | 2-EV3 | Undefined | Undefined |
|   | 0111 | 1 | HV3 | EV3 | 3-EV3 | Undefined | Undefined |
|   | 1000 | 1 | DV | Undefined | Undefined | Undefined | 3-DH1 |
|   | 1001 | 1 | Undefined | Undefined | Undefined | AUX1 | AUX1 |
| 3 | 1010 | 3 | Undefined | Undefined | Undefined | DM3 | 2-DH3 |
|   | 1011 | 3 | Undefined | Undefined | Undefined | DH3 | 3-DH3 |
|   | 1100 | 3 | Undefined | EV4 | 2-EV5 | Undefined | Undefined |
|   | 1101 | 3 | Undefined | EV5 | 3-EV5 | Undefined | Undefined |
| 4 | 1110 | 5 | Undefined | Undefined | Undefined | DM5 | 2-DH5 |
|   | 1111 | 5 | Undefined | Undefined | Undefined | DH5 | 3-DH5 |

Figure 3:
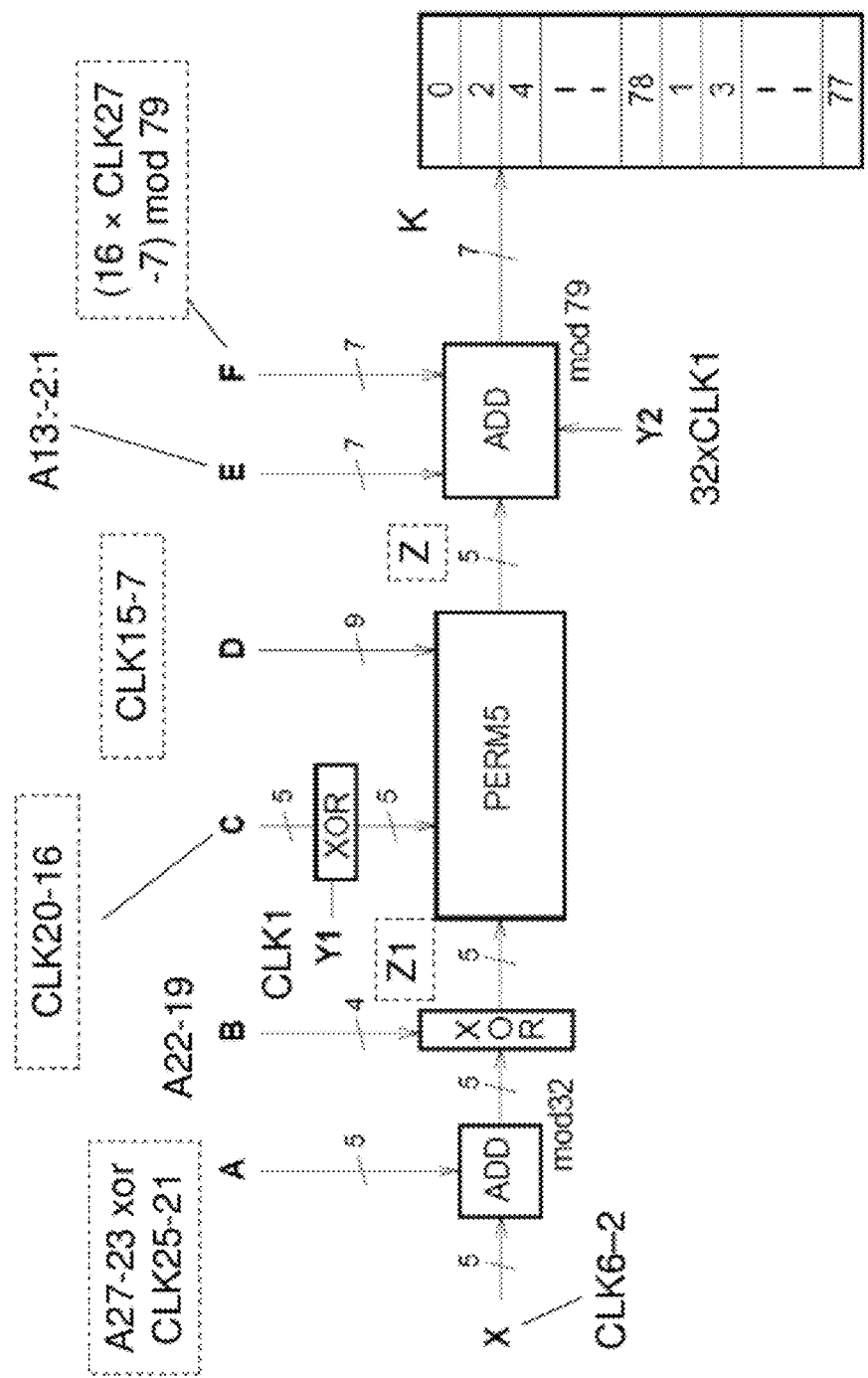
FIG. 3 is a diagram that depicts an example of a pseudo-random frequency selection algorithm that may be used to analyze Bluetooth packet header in order to recover an unknown clock signal according to the techniques described herein.

Turning to FIG. 3, a diagram is shown that depicts an example of a pseudo-random frequency selection algorithm that may be used to both generate and analyze Bluetooth packet headers in order to recover an unknown clock signal. FIG. 3 illustrates the computations associated with a pseudo-random frequency selection process that is used to select one of 79 frequencies (0-78) for frequency hopping Bluetooth transmissions. The frequency selection bits use a combination of destination device address (ADR) and a clock (CLK). The frequency selection bits X, A, B, C, D, E, F, Y1 and Y2 for the Bluetooth Connection state are defined below and are used in the computation blocks as shown in FIG. 3 to generate the hop frequency.

X (5 bits)=CLK[6:2]
Y1 (5 bits)=31×CLK[1]
Y2 (7 bits)=32×CLK[1]
A (5 bits)=ADR[27:23] XOR CLK[25:21]
B (4 bits)=ADR[22:19]
C (5 bits)=ADR[8,6,4,2,0] XOR CLK[20:16]
D (9 bits)=ADR[18:10] XOR CLK[15:7]
E (7 bits)=ADR[13,11,9,7,5,3,1]
F (7 bits)={16×CLK[27:7]} mod 79

Further details of these bits can be found in the Bluetooth specifications.

The 18 bits 210 from FIG. 2, are the scrambled version of the original payload header. The scrambling is done using 6-bits of current CLK (CLK bits 1-6), i.e., X, Y1, and Y2. The CLK itself is 28-bits ranging from CLK 27-CLK 0. The actual CLK value is unknown to the packet analyzer, e.g., analyzer 160, though the relative values of CLK (time differences) are known between different packets. For each of possible 64 values available within 6-bit values ($2^6$=64 possible CLK[6:1] values from zero to 63) for CLK6-CLK1, use those values to descramble the 18-bits 210. This yields 64 descrambled values. The 64 descrambled 18-bits are then processed through the 256 possible CRC initial register values, i.e., an 8-bit CRC ($2^8$=256 possible CRC values). The Upper Address Parts (UAPs) of the Bluetooth address are used to generate the CRCs. If the remainder CRC check polynomial is zero, then the corresponding value of CLK is a possible initial value of the descrambler register and that value of the CRC initial register value is a possible solution.

In general, this solution set is not unique. To give an example, the following input data were used to determine those CRC initial register values that give a zero remainder and are described later. Table 2 contains the raw 54 bit header data for 13 packets. Table 3 lists a corresponding time stamp for each packet, and Table 4 lists the corresponding frequency for each packet. Table 2:

TABLE 2

54 hit headers.

| | | | | | | | | | | | | |
|---|---|---|---|---|---|---|---|---|---|---|---|---|
| 1. | 0 | 0 | 0 | 0 | 0 | 0 | 1 | 1 | 1 | 1 | 1 | 1 |
| | 0 | 0 | 0 | 1 | 1 | 1 | 0 | 0 | 0 | 1 | 1 | 1 |
| | 0 | 0 | 0 | 0 | 0 | 0 | 1 | 1 | 1 | 0 | 0 | 0 |
| | 0 | 0 | 0 | 1 | 1 | 1 | 0 | 0 | 0 | 0 | 0 | 0 |
| | 0 | 0 | 0 | 0 | 0 | 0 | | | | | | |
| 2. | 0 | 0 | 0 | 0 | 0 | 0 | 1 | 1 | 1 | 1 | 1 | 1 |
| | 1 | 1 | 1 | 0 | 0 | 0 | 0 | 0 | 0 | 0 | 0 | 0 |
| | 1 | 1 | 1 | 0 | 0 | 0 | 0 | 0 | 0 | 0 | 0 | 0 |
| | 1 | 1 | 1 | 0 | 0 | 0 | 1 | 1 | 1 | 0 | 0 | 0 |
| | 1 | 1 | 1 | 0 | 0 | 0 | | | | | | |
| 3. | 0 | 0 | 0 | 0 | 0 | 0 | 1 | 1 | 1 | 1 | 1 | 1 |
| | 0 | 0 | 0 | 1 | 1 | 1 | 0 | 0 | 0 | 1 | 1 | 1 |
| | 0 | 0 | 0 | 0 | 0 | 0 | 1 | 1 | 1 | 0 | 0 | 0 |
| | 0 | 0 | 0 | 1 | 1 | 1 | 0 | 0 | 0 | 0 | 0 | 0 |
| | 0 | 0 | 0 | 0 | 0 | 0 | | | | | | |

TABLE 2-continued 54 hit headers.

| | | | | | | | | | | | | |
|---|---|---|---|---|---|---|---|---|---|---|---|---|
| 4. | 0 | 0 | 0 | 0 | 0 | 0 | 0 | 0 | 0 | 0 | 0 | 0 |
| | 0 | 0 | 0 | 0 | 0 | 0 | 1 | 1 | 1 | 1 | 1 | 1 |
| | 1 | 1 | 1 | 0 | 0 | 0 | 0 | 0 | 0 | 1 | 1 | 1 |
| | 1 | 1 | 1 | 1 | 1 | 1 | 1 | 1 | 1 | 0 | 0 | 0 |
| | 0 | 0 | 0 | 0 | 0 | 0 | | | | | | |
| 5. | 0 | 0 | 0 | 0 | 0 | 0 | 0 | 0 | 0 | 0 | 0 | 0 |
| | 0 | 0 | 0 | 0 | 0 | 0 | 1 | 1 | 1 | 1 | 1 | 1 |
| | 1 | 1 | 1 | 0 | 0 | 0 | 0 | 0 | 0 | 1 | 1 | 1 |
| | 1 | 1 | 1 | 1 | 1 | 1 | 1 | 1 | 1 | 0 | 0 | 0 |
| | 0 | 0 | 0 | 0 | 0 | 0 | | | | | | |
| 6. | 0 | 0 | 0 | 1 | 1 | 1 | 1 | 1 | 1 | 1 | 1 | 1 |
| | 0 | 0 | 0 | 1 | 1 | 1 | 0 | 0 | 0 | 1 | 1 | 1 |
| | 1 | 1 | 1 | 0 | 0 | 0 | 1 | 1 | 1 | 1 | 1 | 1 |
| | 0 | 0 | 0 | 1 | 1 | 1 | 1 | 1 | 1 | 1 | 1 | 1 |
| | 0 | 0 | 0 | 1 | 1 | 1 | | | | | | |
| 7. | 0 | 0 | 0 | 1 | 1 | 1 | 0 | 0 | 0 | 1 | 1 | 1 |
| | 1 | 1 | 1 | 0 | 0 | 0 | 0 | 0 | 0 | 0 | 0 | 0 |
| | 0 | 0 | 0 | 1 | 1 | 1 | 0 | 0 | 0 | 1 | 1 | 1 |
| | 0 | 0 | 0 | 0 | 0 | 0 | 0 | 0 | 0 | 0 | 0 | 0 |
| | 0 | 0 | 0 | 1 | 1 | 1 | | | | | | |
| 8. | 0 | 0 | 0 | 1 | 1 | 1 | 0 | 0 | 0 | 0 | 0 | 0 |
| | 1 | 1 | 1 | 0 | 0 | 0 | 1 | 1 | 1 | 0 | 0 | 0 |
| | 0 | 0 | 0 | 0 | 0 | 0 | 1 | 1 | 1 | 1 | 1 | 1 |
| | 1 | 1 | 1 | 0 | 0 | 0 | 0 | 0 | 0 | 1 | 1 | 1 |
| | 1 | 1 | 1 | 0 | 0 | 0 | | | | | | |
| 9. | 0 | 0 | 0 | 1 | 1 | 1 | 1 | 1 | 1 | 1 | 1 | 1 |
| | 0 | 0 | 0 | 0 | 0 | 0 | 0 | 0 | 0 | 1 | 1 | 1 |
| | 0 | 0 | 0 | 0 | 0 | 0 | 1 | 1 | 1 | 0 | 0 | 0 |
| | 1 | 1 | 1 | 1 | 1 | 1 | 0 | 0 | 0 | 1 | 1 | 1 |
| | 0 | 0 | 0 | 0 | 0 | 0 | | | | | | |
| 10. | 0 | 0 | 0 | 0 | 0 | 0 | 1 | 1 | 1 | 0 | 0 | 0 |
| | 1 | 1 | 1 | 1 | 1 | 1 | 1 | 1 | 1 | 0 | 0 | 0 |
| | 0 | 0 | 0 | 1 | 1 | 1 | 1 | 1 | 1 | 1 | 1 | 1 |
| | 1 | 1 | 1 | 0 | 0 | 0 | 0 | 0 | 0 | 1 | 1 | 1 |
| | 0 | 0 | 0 | 0 | 0 | 0 | | | | | | |
| 11. | 0 | 0 | 0 | 0 | 0 | 0 | 0 | 0 | 0 | 0 | 0 | 0 |
| | 0 | 0 | 0 | 0 | 0 | 0 | 1 | 1 | 1 | 1 | 1 | 1 |
| | 1 | 1 | 1 | 0 | 0 | 0 | 0 | 0 | 0 | 1 | 1 | 1 |
| | 1 | 1 | 1 | 1 | 1 | 1 | 1 | 1 | 1 | 0 | 0 | 0 |
| | 0 | 0 | 0 | 0 | 0 | 0 | | | | | | |
| 12. | 0 | 0 | 0 | 1 | 1 | 1 | 0 | 0 | 0 | 1 | 1 | 1 |
| | 0 | 0 | 0 | 1 | 1 | 1 | 0 | 0 | 0 | 1 | 1 | 1 |
| | 1 | 1 | 1 | 1 | 1 | 1 | 1 | 1 | 1 | 1 | 1 | 1 |
| | 1 | 1 | 1 | 1 | 1 | 1 | 1 | 1 | 1 | 0 | 0 | 0 |
| | 1 | 1 | 1 | 1 | 1 | 1 | | | | | | |
| 13. | 0 | 0 | 0 | 1 | 1 | 1 | 0 | 0 | 0 | 0 | 0 | 0 |
| | 1 | 1 | 1 | 1 | 1 | 1 | 1 | 1 | 1 | 0 | 0 | 0 |
| | 1 | 1 | 1 | 0 | 0 | 0 | 1 | 1 | 1 | 0 | 0 | 0 |
| | 0 | 0 | 0 | 0 | 0 | 0 | 1 | 1 | 1 | 1 | 1 | 1 |
| | 1 | 1 | 1 | 1 | 1 | 1 | | | | | | |

Table 3:

TABLE 3

Corresponding time stamps.

| | |
|---|---|
| 1. | 39328192816.0000000000 |
| 2. | 39377647460.0000000000 |
| 3. | 39420992533.0000000000 |
| 4. | 39433192711.0000000000 |
| 5. | 39445991612.0000000000 |
| 6. | 39460092486.0000000000 |
| 7. | 39478991352.0000000000 |
| 8. | 39560391381.0000000000 |
| 9. | 39602441288.0000000000 |
| 10. | 39652691069.0000000000 |
| 11. | 39690790112.0000000000 |
| 12. | 39699640032.0000000000 |
| 13. | 39809943727.0000000000 |

Table 4:

TABLE 4

| | Corresponding frequencies (KHz). |
|---|---|
| 1. | 2465070 |
| 2. | 2479031 |
| 3. | 2474058 |
| 4. | 2454067 |
| 5. | 2473073 |
| 6. | 2458073 |
| 7. | 2469063 |
| 8. | 2458071 |
| 9. | 2466054 |
| 10. | 2459035 |
| 11. | 2473071 |
| 12. | 2475066 |
| 13. | 2439012 |

Using the above data, the 6-bits of unknown CLK (0-63), the following initial CRC registers (or UAPs) give zero remainder:

| Columns 1 through 13 | | | | | | | | | | | | |
|---|---|---|---|---|---|---|---|---|---|---|---|---|
| 0 | 1 | 2 | 3 | 4 | 5 | 6 | 7 | 8 | 9 | 10 | 11 | 12 |
| 149 | 69 | 15 | 223 | 42 | 250 | 176 | 96 | 221 | 13 | 71 | 151 | 98 |
| Columns 14 through 26 | | | | | | | | | | | | |
| 13 | 14 | 15 | 16 | 17 | 18 | 19 | 20 | 21 | 22 | 23 | 24 | 25 |
| 178 | 248 | 40 | 67 | 147 | 217 | 9 | 252 | 44 | 102 | 182 | 11 | 219 |
| Columns 27 through 39 | | | | | | | | | | | | |
| 26 | 27 | 28 | 29 | 30 | 31 | 32 | 33 | 34 | 35 | 36 | 37 | 38 |
| 145 | 65 | 180 | 100 | 46 | 254 | 254 | 46 | 100 | 180 | 65 | 145 | 219 |
| Columns 40 through 52 | | | | | | | | | | | | |
| 39 | 40 | 41 | 42 | 43 | 44 | 45 | 46 | 47 | 48 | 49 | 50 | 51 |
| 11 | 182 | 102 | 44 | 252 | 9 | 217 | 147 | 67 | 40 | 248 | 178 | 98 |
| Columns 53 through 64 | | | | | | | | | | | | |
| 52 | 53 | 54 | 55 | 56 | 57 | 58 | 59 | 60 | 61 | 62 | 63 | |
| 151 | 71 | 13 | 221 | 96 | 176 | 250 | 42 | 223 | 15 | 69 | 149 | |

Although a unique solution has not been obtained, the number of possible solutions have been reduced from 256 to 64. The solutions may be labeled solution set S1, which consists of a clock and CRC pair (CLK_i, CRC_j). To further reduce the solution set S1, subsequent packets may be processed. For the next incoming packet, find the difference in the time between the next packet and the previous one. For all solutions to the CLK used to derive the previous solution set S1, add this time offset, and obtain new scrambler seeds. The new scrambler seeds are iteratively tested to see if the same CRC initial register values work for the next packet.

The error in timing estimation between any set of packets is +/−20 ppm contributed by the Bluetooth device's crystal oscillator (XO) tolerance, and there might be a +/−20 ppm error from the detecting device, for a total error budget of approximately 40 ppm. Hence if the difference between the two packets is less than 312.5 us/40 ppm=7.8 s, then the error in the timing should be less than 312.5 us and hence CLK error should be less than 1 bit for Bluetooth clock rates. In the event that the timing is greater than 7.8 s, then a search is made for a timing range in order of the timing uncertainty. For example, if the timing between two packets is 5 minutes (300 seconds), then the max timing error will be 40*300 us=12 ms. The 12 ms time frame approximately affects CLK bits 0-4. Else, if the data are good enough data and with good time spacing, then data arriving after more than 7.8 s can be ignored.

After two iterations, the number of possible solutions has been reduced since the solutions work across both of the packets. The new solution set, S2, is a subset of S1. Using S2, we again repeat the procedure for a third packet and after adjusting the third set of scrambler seeds for the third packet from the timing offset, we find the set of values in S2 that work for the third packet. This process is repeated until the solution set is reduced to a minimum number. Ideally, the solution set can be reduced to one, i.e., a unique solution. However, a unique solution may not be obtained by the above iterative process as will be explained later.

After a second packet is processed, the solution set is reduced to 16 initial CRC register values that give a zero remainder, as shown below.

| Columns 1 through 13 | | | | | | | | | | | | |
|---|---|---|---|---|---|---|---|---|---|---|---|---|
| 7 | 8 | 14 | 15 | 22 | 23 | 30 | 31 | 38 | 39 | 46 | 47 | 54 |
| 176 | 96 | 248 | 40 | 102 | 182 | 46 | 254 | 219 | 11 | 147 | 67 | 13 |
| Columns 14 through 16 | | | | | | | | | | | | |
| 55 | 62 | 63 | | | | | | | | | | |
| 221 | 69 | 149 | | | | | | | | | | |

After a third packet is processed, the solution set is reduced to four initial CRC register values that give a zero remainder.

| Columns 1 through 4 | | | |
|---|---|---|---|
| 30 | 31 | 62 | 63 |
| 46 | 254 | 69 | 149 |

Additional iterations reproduce the four initial CRC register values. The reason for the four solution limit is due to the 256 ($2^8$) possible CRCs and the 64 ($2^6$) possible CLK values leading to 4 to 1 mapping of CRCs to CLKs, i.e., ($2^8/2^6$)= $2^2$=4))

Thus, the CLK6-1 values corresponding to 30, 31, 62, and 63 for the first packet captured for the descrambler together with the CRC initial value of 46, 254, 69, and 149, respectively, will pass the parity check of the descrambled bits. Thus the CRC initial register bits would be:

| 254 | 1 | 1 | 1 | 1 | 1 | 1 | 1 | 0 |
|-----|---|---|---|---|---|---|---|---|
| 46  | 0 | 0 | 1 | 0 | 1 | 1 | 1 | 0 |
| 149 | 1 | 0 | 0 | 1 | 0 | 1 | 0 | 1 |
| 69  | 0 | 1 | 0 | 0 | 0 | 1 | 0 | 1 |

The corresponding descrambled bits that are possible solutions (CLK_i, CRC_j) to the payload header are as follows:

For (30, 46) data out = Columns 1 through 18

1 0 0 [1 1 1 0] 1 0 1 1 1 1 1 1 1 1 1
For (31, 254) data out = Columns 1 through 18

1 0 0 [1 1 1 1] 1 0 0 1 1 0 0 1 0 1 1
For (62, 69) data out = Columns 1 through 18

1 1 0 [1 0 1 0] 0 1 1 0 1 1 0 0 0 0 1
For (63, 149) data out = Columns 1 through 18

1 1 0 [1 0 1 1] 0 1 0 0 1 0 1 0 1 0 1

The 18 bits follow the format illustrated in FIG. 2. The four bits of the packet type field are enclosed in brackets [TYPE] above for ease delineation. In this example, the packet types can be looked up in Table 1 above to obtain the following types:

[1 1 1 0]=DM5 (ACL)
[1 1 1 1]=DH5 (ACL)
[1 0 1 0]=DM3 (ACL)
[1 0 1 1]=DH3 (ACL)

All of the above packet types were data packet types. If the network operator is only concerned with voice versus data, then a unique solution need not be found in this example since all types refer to data transmission. Type codes that descramble to "reserved" or "undefined" may be discarded. Further, time slot occupancy may be used to further discard possible solutions. By way of example, if the packet type is DM5 (5 time slots) and the transmission had a duration of less than 5 time slots, then the corresponding solution may be discarded. Additional techniques for reaching a unique solution will be described in connection with FIGS. 5a-5g.

Figure 4:
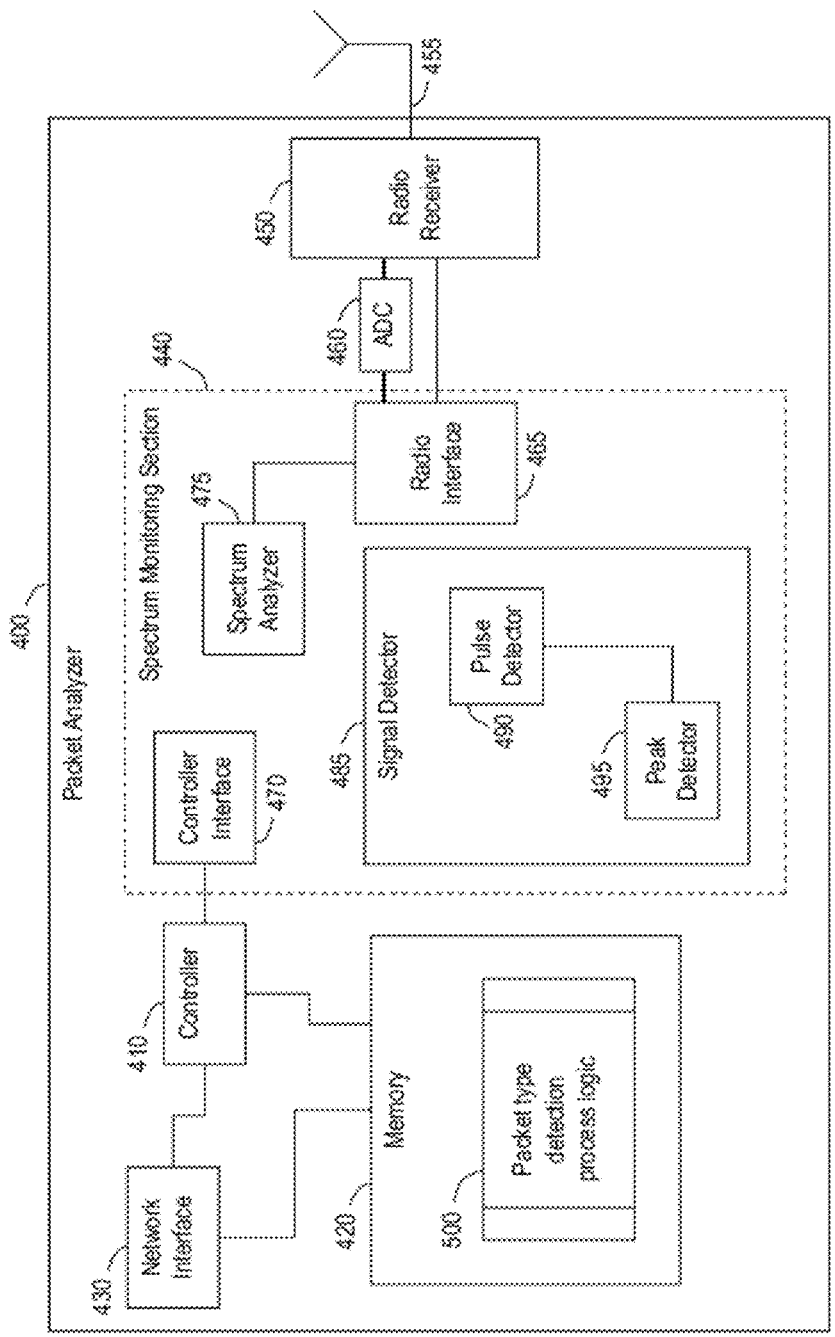
FIG. 4 is a block diagram showing an example of a packet analyzer device that is configured to determine a packet type from a descrambled Bluetooth packet header according to the techniques described herein.

Referring to FIG. 4, a block diagram showing an example of a packet analyzer device, e.g., packet analyzer 160 (FIG. 1), that is configured to determine a packet type from a descrambled Bluetooth packet header. The packet analyzer 160 comprises a processor or controller 410, a memory 420, one or more network interface units 430, a spectrum monitoring section 440, and a receiver 450 with an antenna 455. The spectrum monitoring section 440 comprises a radio interface 465, a controller interface 470, a spectrum analyzer 475, and a signal detector 485. The signal detector 485 has a pulse detector 490 and a peak detector 495.

The receiver 450 receives the signals detected by the antenna 455 and supplies corresponding receive signals to the spectrum monitoring section 440. It is understood that the receiver 450 may comprise receiver circuits. For simplicity, these receiver circuits are not shown. The controller 410 processes signals received by the receiver 450 by way of spectrum monitoring section 440. In addition, the controller 410 performs other transmit and receive control functionality. Parts of the functions of the receiver 450 and controller 410 may be implemented in a demodulator and other parts of the receiver 450 may be implemented in radio receiver circuits. It should be understood that there are analog-to-digital converters (ADCs) and digital-to-analog converters (DACs) in the various signal paths to convert between analog and digital signals.

The network interface unit 430 is an example of a way to receive configuration commands from a network management station and/or for reporting detection information to a network management station.

The controller 410 is, for example, a signal or data processor that operates with the memory device 420 or other data storage block that stores data used for the techniques described herein. The memory 420 may be separate or part of the controller 410. Instructions for performing the various functions described herein, e.g., instructions for packet type detection process logic 500, may be stored in the memory 420 for execution by the controller 410. In other words, the software operations of the process logic 500 may be performed by the controller 410.

The functions of the controller 410 may be implemented by logic encoded in one or more tangible non-transitory media (e.g., embedded logic such as an application specific integrated circuit, digital signal processor instructions, software that is executed by a processor, etc.), wherein the memory 420 stores data used for the computations described herein and stores software or processor instructions that are executed to carry out the computations described herein. Thus, operations performed by the packet analyzer 160 may take any of a variety of forms, so as to be encoded in one or more computer readable tangible (e.g., non-transitory) storage media (e.g., a memory device) for execution, such as with fixed logic or programmable logic (e.g., software/computer instructions executed by a processor) and the controller 410 may be a programmable processor, programmable digital logic (e.g., field programmable gate array) or an application specific integrated circuit (ASIC) that comprises fixed digital logic, or a combination thereof. For example, the controller 410 may be a modem in the base station and thus be embodied by digital logic gates in a fixed or programmable digital logic integrated circuit, which digital logic gates are configured to perform the techniques described herein. In another form, instructions may be embodied in a processor readable medium that is encoded with instructions for execution by a processor (e.g., controller 410) that, when executed by the processor, are operable to cause the processor to perform the functions described herein.

The packet analyzer 160 may be an 802.11 WLAN AP STA, or a specialized sensor device that does not necessarily carry 802.11 traffic, but monitors activity in the frequency band of the WLAN. The spectrum monitoring section 440 monitors radio frequency (RF) activity in the WLAN frequency band. The radio 450 (primarily for receive operations) is capable of tuning to receive energy at each channel (or simultaneously all channels in a wide-band mode) of, for example, any of the unlicensed bands (2.4 GHz and 5 GHz) in which IEEE 802.11 WLANs operate. An analog-to-digital converter (ADC) 460 is coupled to the radio 450 that converts the down converted signals from the radio 440 to digital signals. A radio interface (I/F) 465 is coupled directly to the radio 450 and also to the output of the ADC 460. The real-time spectrum analyzer 475 is coupled to the radio I/F 465. A Fast Fourier Transform (FFT) block (not shown) is coupled between the radio I/F 465 and the spectrum analyzer 475, or included in the spectrum analyzer 475. The spectrum monitoring section 440 generates spectrum activity information that is used to determine the types of signals occurring in the frequency band.

The controller interface 470 interfaces data output by the spectrum monitoring section 440 to the controller 410, and couples configuration information from the controller 410 to the spectrum monitoring section 440. The functions of the spectrum monitoring section 440 will be briefly described in further detail hereinafter. The spectrum analyzer 475 generates data representing a real-time spectrogram of a bandwidth of radio frequency (RF) spectrum, such as, for example, up to 100 MHz. The spectrum analyzer 475 may be used to monitor all activity in a frequency band, for example, the 2.4-2.483 GHz ISM band, or the 5.15-5.35 GHz and 5.725-5.825 GHz UNIT bands. The FFT block referred to above is, for example, a 256 frequency bin FFT block that provides (I and Q) FFT data for each of 256 frequency bins that span the bandwidth of frequency band of interest. A spectrum correction block may be included to correct for I and Q channel imbalance by estimating an I-Q channel imbalance parameter related to phase error and amplitude offset between the I and Q channels, and to suppress a side tone resulting from the RF down conversion process.

The spectrum analyzer 475 may further comprise a power computation block that computes I-FFT data and Q-FFT data, respectively, and adds them together, to output a power value for each FFT frequency bin. The power versus frequency data generated by the spectrum analyzer 475 is also used as input to the signal detector.

The signal detector 485 detects signal pulses in the frequency band and outputs pulse event information entries, which include one or more of the start time, duration, power, center frequency and bandwidth of each pulse that satisfies configurable pulse characteristic criteria associated with a corresponding pulse detector. In the signal detector 485, the peak detector 495 looks for spectral peaks in the power versus frequency data derived from FFT block output, and reports the bandwidth, center frequency and power for each detected peak. The output of the peak detector 495 is one or more peaks and related information. The pulse detector 490 detects and characterizes signal pulses based on input from the peak detector 495. For example, the pulse detector 490 may be configured to detect pulses that match characteristic of the frequency hopping signal to be tracked, e.g., a Bluetooth signal. This would then supply an output stream of timestamp and carrier frequency for candidate pulses that are, after some further processing, used for accumulated timestamp and carrier frequency data for the packet type detection process described herein.

Referring now to FIGS. 5a, 5b, 5c, 5d, 5e, 5f, and 5g, an example flowchart is shown that generally depicts the packet type detection process 500 for analyzing packet headers according to the techniques described herein. At 504, a plurality of packets are received that were formatted using a known scrambling algorithm with an unknown seed, e.g., that is obtained from clock bit values at a time instance as described above. At 508, scrambled packet headers are extracted from respective packets. At 512, a potential seed value for the unknown seed is generated, e.g., clock bit values. At 516, the potential value is tested against all potential register values of a CRC. The test may employ polynomial division like that used with the CRC. By design, when the remainder of the polynomial division is zero, the potential seed value and potential register value combination would result in a successful CRC, thereby identifying a potential test solution.

Figure 5B:
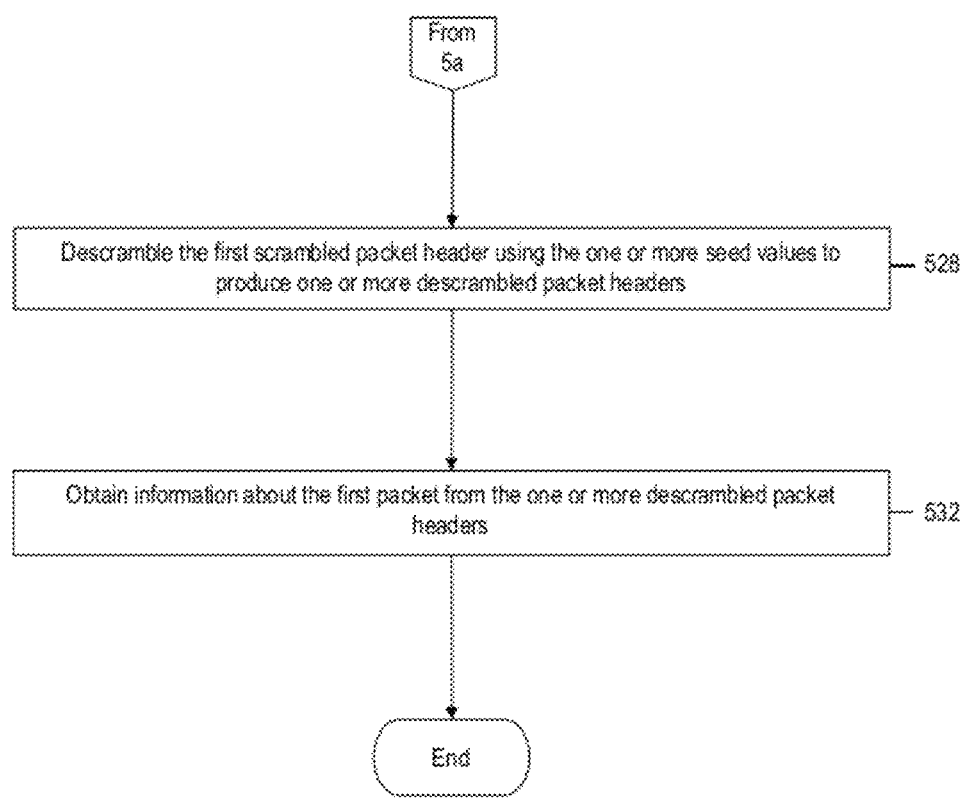

At 520, if the potential seed value results in a solution, the process branches to 512 in order to generate another potential seed value. If the potential seed value does not result in a solution the process continues at 524. At 524, if all of the potential seed values have not been tested the process continues at 512. Otherwise, the process continues on 5b for one solution or on 5c for an alternate solution, depending on the implementation. Referring to FIG. 5b, at 528, the first scrambled packet header is descrambled using the one or more seed values to produce one or more descrambled packet headers. At 532, information about the first packet is obtained from the one or more descrambled packet headers and that portion of the process ends. At this point, a unique solution may not exist. However, the solutions as a whole may provide general information, e.g., packet type, or further narrowing of the solution set may be obtained using the techniques described above and those described in connection with FIGS. 5c-5g.

Figure 5C:
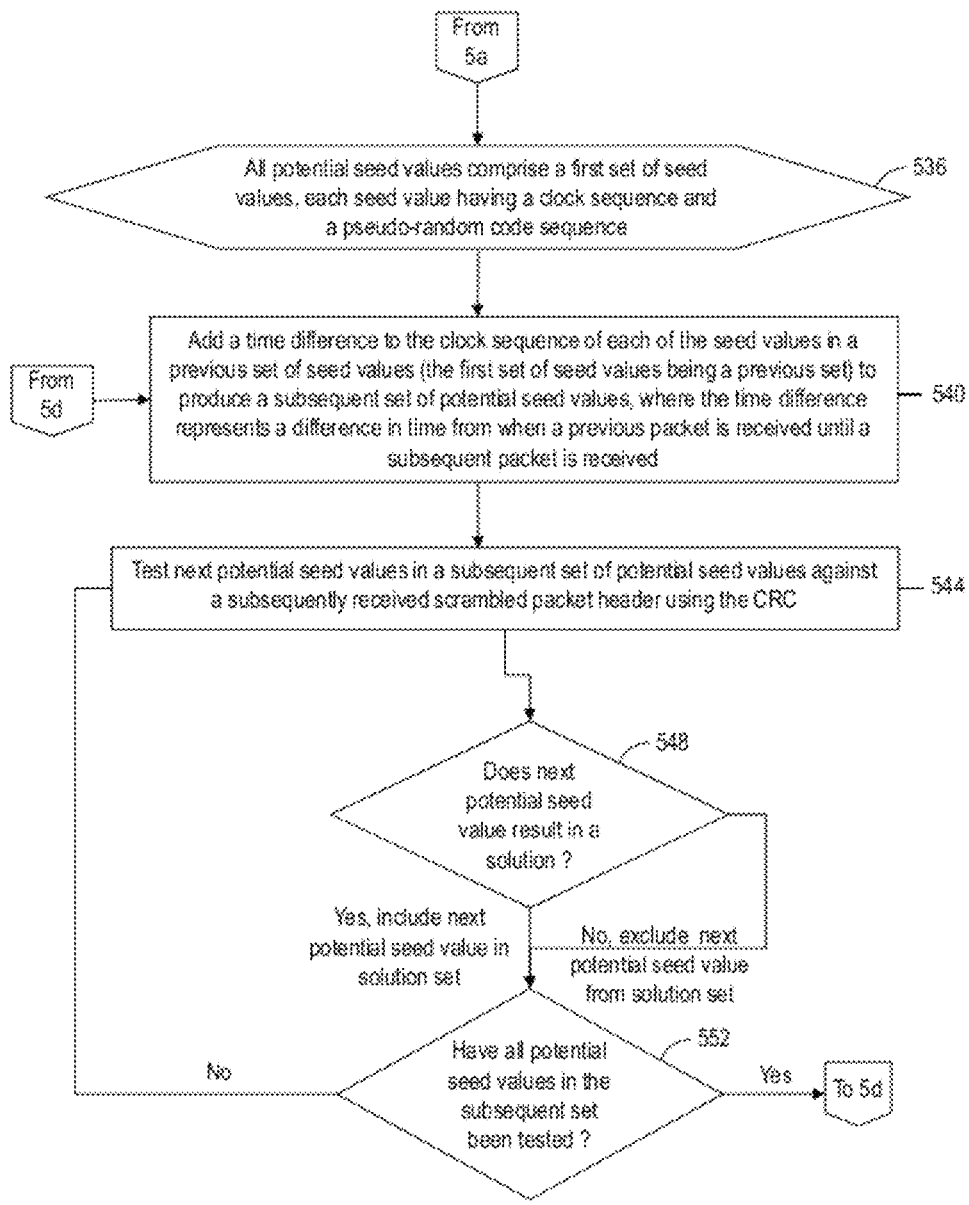

Referring to FIG. 5c, at 536, a precondition is set. All potential seed values that produce a solution comprise a first set of seed values, each seed value having a clock sequence and a pseudo-random code sequence. At 540, a time difference is added to the clock sequence of each of the seed values in a previous set of seed values (the first set of seed values being a previous set) to produce a subsequent set of potential seed values, where the time difference represents a difference in time from when a previous packet is received until a subsequent packet is received. At 544, next potential seed values in a subsequent set of potential seed values are tested against a subsequently received scrambled packet header using the CRC.

At 548, if a next potential seed value does not result in a solution, the process iterates at 544. Otherwise, at 552, a determination is made as to whether all potential seed values in the subsequent set have been tested. If not, the process iterates at 544. If so, the process continues on FIG. 5d. At any point during the iterative process described in connection with FIG. 5c, non-unique solutions within the set may exist that provide enough desired information and the process may be stopped. Further, the solution sets may be narrowed by discarding those solutions that result in invalid packet types, or the packet types may not match the requisite number of time slots or other known information.

Referring to FIG. 5d, at 556, if a minimum set of seed values has not been obtained, the process on FIG. 5c is repeated. If so, at 560, a check is made to determine if a unique seed value been obtained. If so, the process continues on FIG. 5f. If a unique seed value has not been obtained, the process proceeds to 564 where it branches to FIGS. 5g and to 568. At 568, a subset of bits in the clock sequence is also used as an input to generate hopping frequencies used to transmit the plurality of packets of the wireless signal. The process continues on FIG. 5e.

Referring to FIG. 5e, at 572, the subset of bits used to generate the hopping frequencies is determined based on receive frequencies of the plurality of packets. At 576, the subset of bits are matched to bit values in each of the seed values in the minimum number of seed values to obtain a unique seed value and that portion of the process ends. The unique seed value can be used to obtain the unique packet header.

To understand how frequency hopping aids in determining a unique solution, reference is again made to FIG. 3. All items in dashed boxes are unknown. All other CLK and address items are known by virtue of the above iterative process. CLK bits CLK6-1 are known up to 4 possibilities, i.e., a maximum of four seed values remain after the CRCs are performed. The goal is to get the unique CLK6-1 start bits of clock. For each CLK possibility, start with the first packet, using known frequency of the packet, we have 32 possibilities of Z (5 bits=$2^5$) and correspondingly we have 32 possibilities of F. In other words, the known frequency gives rise to K. For each possibility of Z, depending on the number of 1's in Z (5 bits), we have either 1, 5, or 10 possibilities of Z1 before the permutation. For each value of Z1, we have a unique possibility of A.

For subsequent packets, the CLK bits are adjusted with a corresponding time offset between packets and new values of Z are computed for the second packet. Some Zs may not be possible if Z exceeds 32, as Z is 5 bits, while the addition is modulo 79 (as viewed in FIG. 3). For those Zs that exist, find the values of A that would still give rise to same number of 1's in Z1 so that some permutation would give rise to Z. If such a combination does not exist, remove that possibility of A. Repeat until you are left with a unique A. Upon doing this procedure for example 1, we are left with 2 possibilities:

| START CLK BITS | 30 | 31 |
|---|---|---|
| UAP | 46 | 254 |

The reason why both values are possible is because the CLK bits differ only in CLK_1 which can take either of 0 or 1, and can still give rise to a possible solution. The two solutions correspond to TYPE DM5 or TYPE DH5, as described above.

For each of the two remaining possibilities of the initial CLK bits 6-1 from the process above, we have already obtained a unique A and F. For each packet going forward in the frequency hopping scheme, we obtain Z1 as well as Z based on values of A, F, Y1, etc. For each of the two possible initial CLK BITS, there are a total of $2^{14}$ possible permutations through unknown CLK bits 20-16, 15-7, as shown in FIG. 3. For each packet, find those permutations that yield the transformation Z1→Z and retain them for the next stage. Call this set P1. For the next packet, there is a new Z1 and Z. For each of the P1 elements, the new permutation is computed by adding the necessary time offset and determine which of the new permutations work for the new transform Z1→Z. Retain those elements from the initial set that are determined to work. Call this set P2. Proceed through each new packet until the set is empty or a single solution remains for each of the two initial CLK bits. Since the process was started with two possibilities of CLK bits 6-1, one of the solutions the set P1 should reduce to a null set, while the other should still have possible solutions as new packets are processed.

Since the two CLK solutions that remain differ in CLK1 bit, it is this bit that needs resolution. Accordingly, at least 1 of CLK bits 20-16 has to change in order to get to uniqueness, i.e., CLK20-16 has to change in order to alter the transform Z1→Z (PERM 5 block). CLK 16 has a 20.48 second resolution. Therefore, packets are obtained slightly after 20.48 second delay in order for this algorithm to find a unique solution. Once new packets that cross the 20.48 second delay are obtained, CLK bit 16 changes, and hence the first half of the permutation using CLK20-16 XOR Y1 also changes. This mechanism may not necessarily yield uniqueness by default as this new permutation may also work for that packet's Z1→Z transformation. However a couple of packets post 20.48 seconds from the initial packets should give rise to Z1→Z combinations that do not work at this stage. Hence we can eliminate that solution. For EXAMPLE 1, the final UAP was 254, CLK BIT 6-1 was 31. The other possibility with CLK 6-1=30 was eliminated using 3 packets received after 20.48 sec. This solution also matches the slot occupancy based solution described hereinafter.

The techniques described herein operate like a cryptographic attack in that the search spaces are additive versus multiplicative. A simple brute force solution might tend to take impractically large processing delays. For example, the $2^{14}$ possible permutations through unknown CLK bits 20-16, 15-7 are tried on only a small set of values, e.g., two or four versus the full search space. After each step, only the significantly reduced remaining set is used on the subsequent tests.

Referring to FIG. 5*f*, the process continues from FIG. 5*d* when a unique seed value has been obtained. At 580, a scrambled packet header associated with a packet is descrambled using the unique seed value to produce a descrambled packet header. At 584, information about the associated packet is obtained from the descrambled packet header and that portion of the process ends.

Referring to FIG. 5*g*, the process continues from FIG. 5*d* when a unique seed value has not been obtained. At 588, transmission time slot duration is observed for the first packet. At 592, packet types are obtained from the one or more descrambled packet headers. At 596, the transmission time slot duration is matched to corresponding packet types to obtain a unique packet type. The unique packet type having been obtained, the process ends.

As a last part of the process or as an alternate process, the time slot occupancy of each packet may be observed. In the example described above, DH5 is 5 slots, HV3 is 1 slot time in duration. However, if the obtained packet is indeed 5 slots long then the solution is DH5 which is an ACL link. Once we are down to 2 possibilities, the only time we can fail to distinguish based on the time slots is when the two final TYPE choices that are 7 and 9. However, mathematically based on the scrambling procedure, these two choices cannot be the final ones.

In summary, techniques are provided herein for receiving a transmitted first packet that was formatted using a known scrambling algorithm with an unknown seed that is obtained from clock bit values at a time instance. An encoded packet payload header of the first packet is extracted. The encoded packet payload header is decoded to obtain a first scrambled packet payload header. For each potential value of the unknown seed, the first scrambled packet payload header is descrambled to produce a first set of descrambled packet payload headers and for each potential value of initial register values associated with a cyclic redundancy check, the cyclic redundancy check is executed comprising polynomial division on each of the descrambled packet payload headers such that when the polynomial division results in a zero remainder, a potential unscrambled payload header for the first packet is obtained. Information about the first packet is obtained from the potential unscrambled payload header.

It may be determined if the first packet is associated with voice traffic or data traffic based on the information obtained about the first packet. To determine if packets are associated with a combination of voice and data traffic additional packets may be processed. It may also be determined if the first packet is associated with a master communication device or a slave communication device in a wireless network employing master and slave device relationships based on the information and a transmission time associated with the first packet, and when it is determined that the first packet is associated with a slave communication device, the slave communication device is identified.

For each obtained potential unscrambled payload header, a corresponding potential seed value that was used to obtain a corresponding potential unscrambled payload header is stored. A second packet is received and a second scrambled packet payload header is obtained from the second packet. A time difference is generated representing time between reception of the first packet and the second packet. The time difference is added to each of the corresponding potential seed values to generate a set of potential seed values for descrambling the second scrambled packet payload header, and for each potential seed value in the set, the second scrambled packet payload header is descrambled to produce a second set of descrambled packet payload headers. For each potential value of initial register values associated with a cyclic redundancy check, the cyclic redundancy check is executed comprising polynomial division on each of the descrambled packet payload headers in the second set such that when the polynomial division results in a zero remainder, a corresponding potential seed value for the first packet is further validated. When the polynomial division results in a non-zero remainder for a descrambled packet payload header in the second set, the corresponding potential seed value is discarded.

The above description is intended by way of example only.

What is claimed is:

1. A method comprising:
receiving a plurality of packets that were formatted using a known scrambling algorithm with an unknown seed;
obtaining a scrambled packet payload header from respective ones of the plurality of packets;
for each potential value of the unknown seed, descrambling a packet payload header to produce descrambled packet payload headers;
for each potential value of initial register values associated with a cyclic redundancy check, executing the cyclic redundancy check comprising polynomial division on each of the descrambled packet payload headers such that when the polynomial division results in a zero remainder, a potential unscrambled payload header is obtained; and
repeating the descrambling and executing processing on subsequently received packets until a desired number of potential seed values are obtained.

2. The method of claim 1, further comprising determining if one or more of the plurality of packets are associated with voice traffic, data traffic, or a combination of voice and data traffic based on the information contained within corresponding unscrambled payload headers.

3. The method of claim 1, further comprising:
determining if one or more of the plurality of packets are associated with a master communication device or a slave communication device in a wireless network employing master and slave device relationships based on the information and a transmission time associated with the one or more of the plurality of packets; and
wherein when it is determined that the one or more of the plurality of packets are associated with a slave communication device, identifying the slave communication device.

4. The method of claim 1, further comprising:
for each obtained potential unscrambled payload header, storing a corresponding potential seed value that was used to obtain a corresponding potential unscrambled payload header;
obtaining a first scrambled packet payload header from a first packet of the plurality of packets and a second scrambled packet payload header from a second packet of the plurality of packets;
generating a time difference representing time between reception of the first packet and the second packet;
adding the time difference to each of the corresponding potential seed values to generate a set of potential seed values for descrambling the second scrambled packet payload header;
for each potential seed value in the set, descrambling the second scrambled packet payload header to produce a second set of descrambled packet payload headers; and
for each potential value of initial register values associated with a cyclic redundancy check, executing the cyclic redundancy check comprising polynomial division on each of the descrambled packet payload headers in the second set such that when the polynomial division results in a zero remainder, a corresponding potential seed value for the first packet is further validated.

5. The method of claim 4, further comprising:
iteratively processing successively received packets comprising:
obtaining a scrambled packet payload header from each of the successively received packets;
adding time differences between reception of the successively received packets to remaining potential seed values to produce successive sets of potential seed values;
descrambling the scrambled packet payload headers using corresponding successive sets of potential seed values;
for each potential value of initial register values associated with a cyclic redundancy check, executing the cyclic redundancy check to validate or discard potential seed values; and
when a set of potential seed values is produced that comprises a known minimum number of potential seed values that can be obtained by iterative processing, terminating the iterative processing, and wherein the known minimum number is based on the potential seed values and the scrambling algorithm.

6. The method of claim 5, wherein when the minimum number of potential seed values does not result in a single potential seed value, further comprising:
detecting a first frequency used to transmit the first packet of the plurality of packets, wherein the unknown seed value and a first unknown data value were used as starting inputs to a frequency hopping algorithm to generate the frequency used to transmit the first packet; and
determining one or more potential first input values of the first unknown data value using combinations of the potential seed values in the minimum set and all potential values of the first unknown data value such that the frequency hopping algorithm generates the first frequency.

7. The method of claim 6, wherein when determining one or more potential first input values does not result in a single potential first input value, further comprising:
iteratively processing successively received packets comprising:
detecting frequencies used to transmit subsequent packets;
generating corresponding time offsets for time differences between the successively received packets;
determining which of the one or more potential first input values in combination with the potential seed values in the minimum set with corresponding time offsets generates the first frequency by way of the frequency hopping algorithm;

discarding potential first input values that do not generate a correct frequency;

discarding potential seed values in the minimum set that do not generate a correct frequency when used in combination with any of the potential first input values; and when a unique first input value is obtained by the iterative processing of successively received packets, terminating the iterative processing of successively received packets.

8. The method of claim 7, wherein when discarding potential seed values in the minimum set does not result in a single potential seed value, further comprising:

iteratively processing the first and one or more subsequently received packets comprising:

executing the frequency hopping algorithm using each remaining potential seed value, the unique first input value, and potential second input values of unknown data value that is used as an input to transform function of the frequency hopping algorithm;

discarding potential seed values that do not result in correct operation of the transform function; and stopping the iterative processing of the first and one or more subsequently received packets when a unique potential seed value is obtained.

9. The method of claim 4, further comprising:

observing a transmission time slot duration for the first packet;

obtaining packet types from the first set of descrambled packet payload headers; and matching the transmission time slot duration to corresponding packet types to obtain a unique packet type.

10. The method of claim 1, further comprising:

determining whether one or more packets of the plurality of packets were transmitted from a device that is a potential network threat; and implementing a network security policy to mitigate network threats when one or more packets of the plurality of packets were transmitted from a device that is a potential network threat.

11. The method of claim 1, further comprising determining a geolocation of a device that transmitted one or more packets of the plurality of packets.

12. An apparatus comprising:

a receiver configured to receive a plurality of packets;

a controller coupled to the receiver and configured to:

receive a plurality of packets via the receiver that were formatted using a known scrambling algorithm with an unknown seed;

obtain scrambled packet payload headers from respective ones of the plurality of packets;

for each potential value of the unknown seed, descramble a scrambled packet payload header to produce descrambled packet payload headers;

for each potential value of initial register values associated with a cyclic redundancy check, execute the cyclic redundancy check comprising polynomial division on each of the descrambled packet payload headers such that when the polynomial division results in a zero remainder, a potential unscrambled payload header is obtained;

repeat said descramble and execute processing on subsequently received packets until a desired number of potential seed values are obtained.

13. The apparatus of claim 12, wherein the controller is further configured to:

analyze unscrambled payload headers unscrambled using the desired number of potential seed values; and discard those values of the unknown seed used to descramble packet payload headers when a payload type field in a corresponding one of the unscrambled payload headers is not consistent with known information about the packet.

14. The apparatus of claim 12, wherein the controller is further configured to determine if one or more of the plurality of packets are associated with voice traffic, data traffic, or a combination of voice and data traffic based on information contained within corresponding unscrambled payload headers.

15. The apparatus of claim 12, wherein the controller is further configured to determine if the packets are associated with a master communication device or a slave communication device in a wireless network employing master and slave device relationships based on payload header information and transmission timing associated with the packets, wherein when it is determined that the packet is associated with a slave communication device, the controller is further configured to identify the slave communication device.

16. The apparatus of claim 12, wherein the controller is further configured to:

add time differences between reception of the subsequently received packets to remaining potential seed values to produce successive sets of potential seed values; and descramble subsequently received scrambled packet payload headers using corresponding successive sets of potential seed values.

17. The apparatus of claim 12, wherein when the desired number of potential seed values does not result in seed values that generate deterministic information about the packets, the controller is further configured to:

detect a frequency used to transmit a packet, wherein the unknown seed value and a first unknown data value are used as starting inputs to a frequency hopping algorithm to generate the frequency used to transmit the packet; and determine one or more potential first input values of the first unknown data value using combinations of the potential seed values in the desired number and all potential values of the first unknown data value such that the frequency hopping algorithm generates the frequency.

18. The apparatus of claim 17, wherein when the controller determines that one or more potential first input values does not result in a single potential first input value, the controller is further configured to iteratively:

detect frequencies used to transmit subsequent packets;

generate corresponding time offsets for time differences between the subsequently received packets;

determine which of the one or more potential first input values in combination with the potential seed values in the minimum number of potential seed values with corresponding time offsets generate subsequent frequencies by way of the frequency hopping algorithm;

discard potential first input values that do not generate a correct frequency;

discard potential seed values in the minimum set that do not generate a correct frequency when used in combination with any of the potential first input values to produce a remaining number of potential seed values; and when a unique first input value is obtained, terminate the iterative processing of successively received packets.

19. The apparatus of claim 18, wherein when the remaining number of potential seed values does not result in a single potential seed value, the controller is further configured to iteratively:
execute the frequency hopping algorithm using each remaining potential seed value, the unique first input value, and potential second input values of unknown data value that is used as an input to transform function of the frequency hopping algorithm;
discard potential seed values that do not result in correct operation of the transform function; and
terminate the iterative processing of the first and one or more subsequently received packets when a unique potential seed value is obtained.

20. One or more non-transitory computer readable storage media storing instructions that, when executed by a processor, cause the processor to:
receive a plurality of packets via the receiver and formatted using a known scrambling algorithm with an unknown seed;
obtain scrambled packet payload headers from respective ones of the plurality of packets;
for each potential value of the unknown seed, descramble a scrambled packet payload header to produce descrambled packet payload headers;
for each potential value of initial register values associated with a cyclic redundancy check, execute the cyclic redundancy check comprising polynomial division on each of the descrambled packet payload headers such that when the polynomial division results in a zero remainder, a potential unscrambled payload header is obtained;
discard those values of the unknown seed used to descramble packet payload headers that do not result in a zero remainder; and
repeat the descramble, execute, and discard processing on subsequently received packets until a desired number of potential seed values are obtained.

21. The non-transitory computer readable storage media of claim 20, further comprising instructions that, when executed by a processor, cause the processor to:
analyze unscrambled payload headers unscrambled using the desired number of potential seed values; and
discard those values of the unknown seed used to descramble packet payload headers when a payload type field in a corresponding one of the unscrambled payload headers is not consistent with known information about the packet.

22. The non-transitory computer readable storage media of claim 20, further comprising instructions that, when executed by a processor, cause the processor to determine if one or more of the plurality of packets are associated with voice traffic, data traffic, or a combination of voice and data traffic based on information contained within corresponding unscrambled payload headers.

23. The non-transitory computer readable storage media of claim 20, further comprising instructions that, when executed by a processor, cause the processor to:
add time differences between reception of the subsequently received packets to remaining potential seed values to produce successive sets of potential seed values; and
descramble subsequently received scrambled packet payload headers using corresponding successive sets of potential seed values.

24. The non-transitory computer readable storage media of claim 20, further comprising instructions that, when executed by a processor, cause the processor to:
detect a frequency used to transmit a packet, wherein the unknown seed value and a first unknown data value are used as starting inputs to a frequency hopping algorithm to generate the frequency used to transmit the packet when the desired number of potential seed values does not result in seed values that generate deterministic information about the packets; and
determine one or more potential first input values of the first unknown data value using combinations of the potential seed values in the desired number and all potential values of the first unknown data value such that the frequency hopping algorithm generates the frequency.

25. The non-transitory computer readable storage media of claim 24, further comprising instructions that, when executed by a processor, cause the processor to iteratively:
detect frequencies used to transmit subsequent packets when it is determined that one or more potential first input values does not result in a single potential first input value;
generate corresponding time offsets for time differences between the subsequently received packets;
determine which of the one or more potential first input values in combination with the potential seed values in the minimum number of potential seed values with corresponding time offsets generate subsequent frequencies by way of the frequency hopping algorithm;
discard potential first input values that do not generate a correct frequency;
discard potential seed values in the minimum set that do not generate a correct frequency when used in combination with any of the potential first input values to produce a remaining number of potential seed values; and
when a unique first input value is obtained, terminate the iterative processing of successively received packets.

26. The non-transitory computer readable storage media of claim 25, further comprising instructions that, when executed by a processor, cause the processor to iteratively:
execute the frequency hopping algorithm using each remaining potential seed value, the unique first input value, and potential second input values of unknown data value that is used as an input to transform function of the frequency hopping algorithm when the remaining number of potential seed values does not result in a single potential seed value;
discard potential seed values that do not result in correct operation of the transform function; and
terminate the iterative processing of the first and one or more subsequently received packets when a unique potential seed value is obtained.

* * * * *

UNITED STATES PATENT AND TRADEMARK OFFICE
CERTIFICATE OF CORRECTION

PATENT NO.         : 8,776,221 B2
APPLICATION NO.    : 13/342293
DATED              : July 8, 2014
INVENTOR(S)        : Rangarajan et al.

Page 1 of 1

It is certified that error appears in the above-identified patent and that said Letters Patent is hereby corrected as shown below:

In the Claims

Column 17, Line 64, after "obtained;" insert the word --and--

Signed and Sealed this
Fifteenth Day of March, 2016

Michelle K. Lee
*Director of the United States Patent and Trademark Office*